(No Model.)

A. CORBIN, Jr.
DISK HARROW.

No. 315,127. Patented Apr. 7, 1885.

Witnesses:
H. Burke
H. E. Bliss

Inventor:
Amasa Corbin Jr
by Doubleday & Blinaty

N. PETERS, Photo-Lithographer, Washington, D. C.

UNITED STATES PATENT OFFICE.

AMASA CORBIN, JR., OF GOUVERNEUR, NEW YORK.

DISK-HARROW.

SPECIFICATION forming part of Letters Patent No. 315,127, dated April 7, 1885.

Application filed April 17, 1884. (No model.)

*To all whom it may concern:*

Be it known that I, AMASA CORBIN, Jr., a citizen of the United States, residing at Gouverneur, in the county of St. Lawrence and State of New York, have invented certain new and useful Improvements in Disk-Harrows, of which the following is a specification, reference being had therein to the accompanying drawings.

Figure 1:
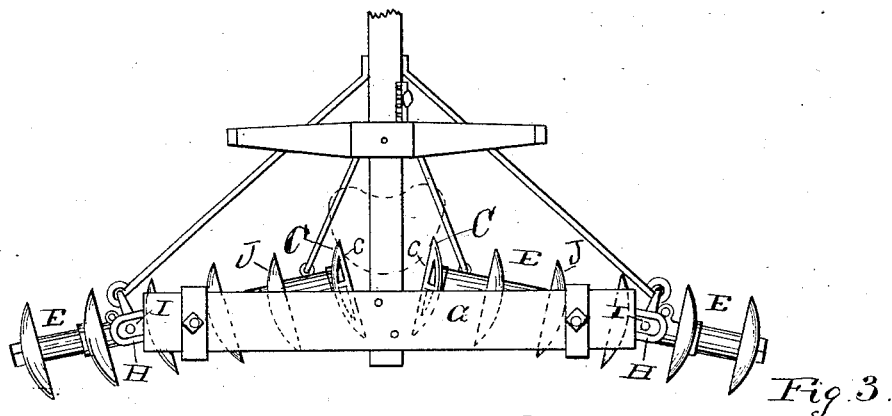
Figure 2:
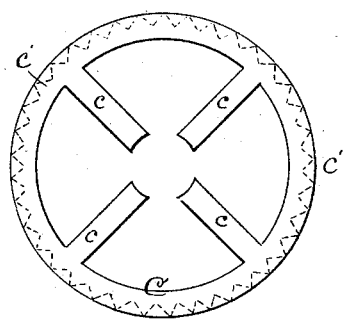
Figure 3:
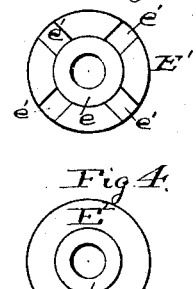
Figure 4:
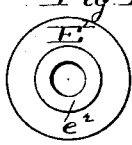
Figure 5:
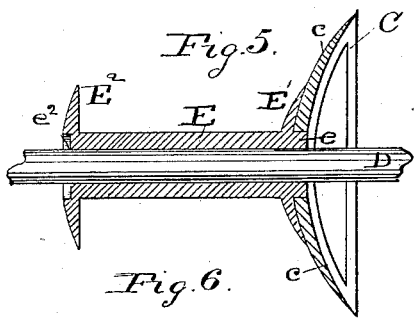
Figure 6:
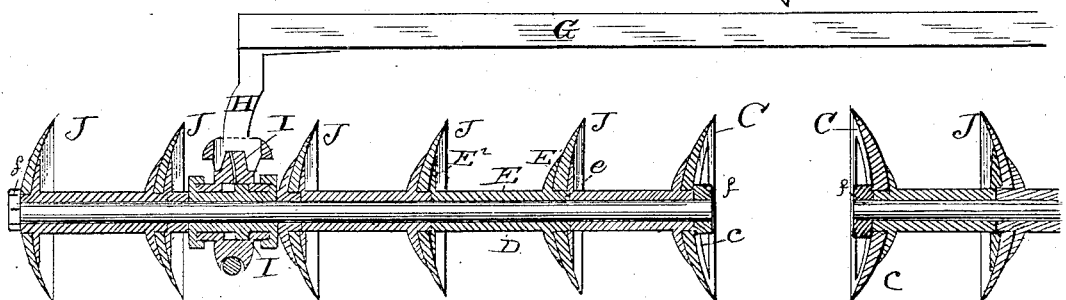

Figure 1 is a plan or top view of a harrow containing my invention. Fig. 2 is a face view of one of my improved spoked disks. Fig. 3 is a view of one end of a sleeve or thimble which I propose to use in connection with the disk shown in Fig. 2. Fig. 4 is a view of the opposite end of the sleeve or thimble. Fig. 5 is a vertical central section of a portion of a gang-axle having the disk shown in Fig. 2 secured thereto by means of the sleeves shown in Figs. 3 and 4. Fig. 6 is a similar section of an entire disk-gang and other parts upon a reduced scale.

In Fig. 2 I have shown a hubless spoked disk consisting of a rim, C, with inwardly-projecting spokes or arms $c\ c$, preferably four in number, which approach a common center, and in practice I prefer to make the inner ends of these spokes in arcs of a circle which shall be concentric to the periphery of the disk, and consequently to the center of a gang-axle upon which I propose to mount these disks. I propose to make these disks concavo-convex to any desired extent, as is customary in disks which are used upon harrows as ordinarily constructed.

Referring particularly to Figs. 2, 3, 4, and 5, D is a gang-axle. E E' E$^2$ is a sleeve mounted upon the gang-axle. The flange E' at one end of this sleeve is concave, so as to fit closely the convex surface of the disk C $c\ c$, and is provided centrally with a hub or boss, $e$, of a diameter about equal to the space between the inner ends of the spokes or arms $c\ c$, upon which the disk is mounted, and which serves to center it relatively to the gang-axle, as will be readily understood without further explanation.

For the purpose of further securing the disks to the thimble I propose under some circumstances to provide the flange E' with ribs or other projections, $e'$, Fig. 3, adapted to engage with the sides of the spokes or arms, so as to prevent the thimble from rotating without carrying with it one of the disks. The opposite end of the thimble is provided with a flange, E$^2$, which is recessed centrally, as at $e^2$, so that the outer edge of the flange only shall engage with the spokes of the disk inside of the row of ribs $e'$, which latter may be arranged in a circle concentric to the gang-axle.

I am aware that a spoked disk having an outer cutting-rim and a central hub adapted to surround an axle is old, and hence do not claim, broadly, a spoked disk. I am also aware that colters for plows consisting of a blade the central portion of which is slitted, the cut parts being bent outward alternately in opposite directions, so as to form an expanded or increased axial bearing for the colter, are old; but my disk differs from any others of which I have knowledge in that it is hubless and its spokes project inwardly toward a common center, whereby it is adapted to be mounted in the manner above described, and possesses certain advantages, both of construction and operation, not possessed by any disks of which I am aware.

$f f$, Fig. 6, are nuts applied to the outer ends of the gang-axle to prevent the escape of the thimbles, and these nuts may be screwed up, so as to prevent undue looseness of the parts which are mounted on the gang-axle.

In practice I propose to mount one of the sleeves in a hanger or bracket-bearing, H, by means of a universal joint at the lower end of the hanger, which may be forked to receive the thimble and universal joint; but as I propose to use any of the well-known constructions which are adapted for connecting the thimble with the lower end of the hanger it is not necessary to describe the construction of such parts in detail.

In that class of harrows in which the gang-axles are each supported at both ends I propose to employ any of the bearings which are commonly used for that purpose in machines of the organization.

From an examination of the drawings it will be readily understood that, even when the flange E' is not provided with ribs $e'$, the disk which is mounted upon the hub or boss e will rotate with the sleeve; and it will be also understood that a gang-axle and all of the disks and their corresponding sleeves or thimbles will ordinarily rotate together, the construction and relation of parts being such that it is impossible to so clamp the disks, the thimbles, and the axle to each other as to prevent independent rotation of the disks.

In many characters and conditions of soils it will be found that the disk shown in Fig. 2 will effect a more thorough pulverization of the soil by going once over the ground than can be accomplished by the use of imperforate disks, either flat or concave, going once over the ground.

When preferred, the flange E' may be provided with radially-projecting fingers adapted to engage with the convex face of each of the spokes or arms, and thus assist in supporting the same against the thrust or strain to which they are subjected when in ordinary operation.

Under some circumstances the hub or boss e might be omitted and the centering of the disk C c c relative to the gang-axle effected by means of ribs or lugs cast upon one or the other, or both, of the opposing faces of the flanges E' E², in such position as to engage with the edges of the spokes or arms c c; but I prefer the construction of parts shown in Figs. 3 and 4.

Although I prefer to make the disk C c c with a continuous circular periphery, yet its outer edge might be notched, as indicated in dotted lines c', Fig. 2.

I am aware of the construction of harrow shown in Patent No. 146,224, to E. Bayliss, granted January 6, 1874; but his disk and the method of attaching it to the axle are very different from mine. His disks are imperforate, except at the center, to receive the gang-axle and to receive the locking-spurs carried by the spacing sleeves or thimbles. They are not centered upon a hub carried by the sleeve, as mine are, and hence do not require the peculiar construction of sleeve herein claimed.

I am also aware of the Patent No. 238,655, granted to J. S. Corbin, March 8, 1881.

The method of securing the disks to the spacing-thimbles shown in this patent is also different from mine. Each thimble and clamping-ring shown in said Corbin's patent forms a complete lock for each disk, while in my construction the axle and two adjacent sleeves, with their respective flanges, must co-operate by being clamped together before the disk will be supported.

In working the second part of my invention I propose to use any of the well-known disk-harrows in which the disks are arranged with their concave sides toward the tongue or center of the machine, the gang-shafts being inclined to the line of draft with their inner ends in advance of their outer ends. In harrows of this organization, in which the disk-gangs are imperforate except to receive the axles, difficulty has been experienced because of the tendency to ridge up the earth between the two disks in the center of the machine— that is to say, between the innermost disk of one gang and the adjacent innermost disk of the opposite gang. Sometimes, also, sods and lumps of earth will get caught between these inner adjacent disks, and thus clog up, interfering seriously with a proper pulverization and manipulation of the soil. To overcome this difficulty I place one of the disks shown in Fig. 2, or an ordinary spoked disk, or a disk perforated with holes of suitable size and number, upon the inner end of each gang-axle, the entire series of disks, thimbles, and the supporting-shaft of each gang being firmly bolted to each other, so that they shall all rotate together, the gangs being mounted in suitable journal-boxes of any usual or preferred construction to facilitate such simultaneous rotation.

In Fig. 6 I have indicated a construction of this character in which the disk-gangs are connected with the cross bar or girt G by means of a hanger, H, carrying at its lower end a universal joint at I, made in two parts and bolted together so as to clasp one of the thimbles, the construction of parts being such that the thimbles, shafts, and disks can rotate freely within the bearing formed for their reception in the universal joint, and can also have the vibratory movements, which are desirable in this class of harrow.

It will of course be understood that by reason of the spoked disks being compelled to rotate simultaneously with the other imperforate disks, J, and the axle in each gang, a proper pulverization of the soil may be effected without the objectionable ridging up of earth which has been alluded to, because the soil can readily pass through the disks between their spokes. This rotation of the spoked disks will also effectually prevent any such clogging between the adjacent inner disks, as frequently occurs when imperforate disks are employed; but I do not wish to be limited to such construction as will insure that all the disks of each gang shall rotate simultaneously, because some of the advantages of my invention can be attained under such construction and arrangement of parts as will permit the spoked or perforated disks to rotate independently of the imperforate disks in each gang.

What I claim is—

1. As a new article of manufacture, a harrow-disk having a substantially continuous periphery or rim, C, and arms or spokes c projecting inwardly from said peripheral rim toward a common center, said spokes being connected together only by rim C, substantially as set forth.

2. As a new article of manufacture, a harrow-disk having a continuous periphery or rim, C, and arms or spokes c projecting inwardly from said peripheral rim, the inner ends of the spokes being formed upon arcs of a circle, whereby said spokes are adapted to be mounted upon and partially encircle an axle or bearing, said spokes being connected together only by rim C, substantially as set forth.

3. In a harrow, the combination of a gang-axle, two or more sleeves, E, each provided with a hub, $e$, and flanges $E'$ $E^2$, disks mounted upon said hubs $e$, between the flanges $E'$ $E^2$ on adjacent sleeves, and means, substantially such as described, for clamping said sleeves and disks together, as described.

4. The herein-described sleeve for a disk-harrow, provided at one end with a flange, $E'$, and a hub, $e$, and at its opposite end with a flange, $E^2$, adapted to engage with the disk having inwardly-projecting spokes, substantially as set forth.

5. The herein-described sleeve for a disk-harrow, provided at one end with a flange, $E'$, having the ribs or projections $e'$, and provided at its opposite end with a flange, $E^2$, substantially as and for the purposes set forth.

6. In combination with the sleeve E, having a flange, $E'$, at one end, provided with ribs $e'$, and the flange $e^2$ at the opposite end, the disk C, provided with inwardly-projecting spokes, which lie between the ribs $e'$, substantially as set forth.

7. The herein-described sleeve for a disk-harrow, provided at one end with a flange, $E'$, and a hub, $e$, and at its opposite end with a flange, $E^2$, and a recess, $e^2$, substantially as and for the purposes set forth.

8. In a disk-harrow, the combination of the axle, the imperforate disks, the perforated disk at the inner end of the axle, and means for locking the axle and the sleeves to the disks to compel a perforated disk to rotate with the imperforate disks, substantially as set forth.

9. In a disk-harrow, the combination of two disk-gangs, each provided at its inner end with a spoked or perforated disk and with a series of imperforate disks, the concave sides of the disks being toward the center of the harrow, substantially as set forth.

In testimony whereof I affix my signature in presence of two witnesses.

AMASA CORBIN, JR.

Witnesses:
 H. M. MUNSELL,
 G. J. PARTINGTON.